United States Patent [19]

Caswell

[11] 4,265,867

[45] May 5, 1981

[54] PREPARATION OF DICALCIUM PHOSPHATE

[75] Inventor: Bruce F. Caswell, Whitmore Lake, Mich.

[73] Assignee: Arcanum Corporation, Ann Arbor, Mich.

[21] Appl. No.: 161,718

[22] Filed: Jun. 20, 1980

[51] Int. Cl.³ .................. C01B 15/16; C01B 25/26
[52] U.S. Cl. ........................................... 423/309
[58] Field of Search ..................... 423/308, 309, 311

[56] References Cited

U.S. PATENT DOCUMENTS

| | | | |
|---|---|---|---|
| 2,948,590 | 8/1960 | Smalter et al. | 423/309 |
| 3,409,394 | 11/1968 | Sprigg | 423/309 |
| 4,112,118 | 9/1978 | Cussons et al. | 423/309 |
| 4,166,839 | 9/1979 | Skauli et al. | 423/309 |

FOREIGN PATENT DOCUMENTS

| | | | |
|---|---|---|---|
| 661093 | 1/1965 | Belgium | 423/309 |
| 45-2652 | 1/1970 | Japan | 423/309 |
| 592747 | 12/1975 | U.S.S.R. | 423/309 |

*Primary Examiner*—Herbert T. Carter
*Assistant Examiner*—Wayne A. Langel
*Attorney, Agent, or Firm*—Blanchard, Flynn, Thiel, Boutell & Tanis

[57] ABSTRACT

Calcium oxide particles are suspended in an inert, water-insoluble, organic carrier liquid. While the suspension is agitated, phosphoric acid and water are added whereby to form agglomerates consisting of dicalcium phosphate useful in animal feeds.

7 Claims, No Drawings

PREPARATION OF DICALCIUM PHOSPHATE

This invention relates to a process for preparing granular dicalcium phosphate suitable for use as an animal feed supplement.

It is conventional to prepare dicalcium phosphate, suitable for use as an animal feed supplement, by reacting heated, defluorinated, wet-process phosphoric acid with an aqueous slurry of finely ground limestone, in a pugmill or the like. The reaction product is dried and screened. The reaction scheme is as follows:

$$CaO + H_3PO_4 \rightarrow CaHPO_4 + H_2O.$$

The obtained product is usually the dihydrate, $CaHPO_4.2H_2O$. The water content is controlled somewhat by the drying step.

Processes for the preparation of dicalcium phosphate are disclosed in U.S. Pat. Nos. 2,728,635, 2,759,795, 2,799,557, 2,948,590, 3,294,486, 3,353,908 and 3,427,125.

The known processes for preparing dicalcium phosphate suffer from one or more of the following disadvantages:

1. Milling or grinding is required in order to obtain a given grain size range and grain size distribution of the dicalcium phosphate product. The milling or grinding is expensive and requires much energy;
2. Many processes involve many operational steps, including ripening, decantation, washing, filtering, etc. Filtering of the produced dicalcium phosphate is quite difficult.

It is a principal object of this invention to provide an improved process for producing dicalcium phosphate, which process ameliorates the shortcomings and disadvantages of the prior art processes.

It is another object of this invention to provide an improved process for producing dicalcium phosphate, as aforesaid, which is well adapted for large scale industrial manufacture and which uses inexpensive and readily available reagents and conventional processing equipment.

It is another object of this invention to provide an improved process, as aforesaid, in which defluorinated wet-process phosphoric acid is substantially completely reacted with calcium oxide in one reaction stage to the point of eliminating substantially all of the free acid from the reaction mixture.

It is another object of this invention to provide an improved process, as aforesaid, in which the product issuing from the reactor consists essentially of solid agglomerates of dicalcium phosphate particles dispersed in an organic liquid carrier medium, whereby the agglomerates can be easily separated from the organic liquid carrier medium and then dried to obtain said agglomerates in a dry condition suitable for use as an ingredient of animal feeds.

It has now been found, unexpectedly in view of the prior art, that the above difficulties of the conventional processes for the manufacture of dicalcium phosphate can be obviated by using, as the starting materials, an aqueous solution of defluorinated, wet-process, phosphoric acid and a suspension of particles of solid calcium oxide, suspended in a water-insoluble, inert, organic, carrier liquid. These starting materials are rapidly and intimately mixed with one another, in a reactor, in substantially stoichiometric proportions, according to the reaction scheme $$CaO + H_3PO_4 \rightarrow CaHPO_4 + H_2O,$$

in the presence of sufficient water that there are formed agglomerates of dicalcium phosphate suspended in said water-insoluble, inert, organic, carrier liquid. The agglomerates consist essentially of dicalcium phosphate particles bonded together by liquid bridges consisting essentially of water. The water-insoluble, inert, organic, carrier liquid is separated from the agglomerates and the agglomerates are then dried.

The broad process of forming an agglomerated product, such as a pellet or a ball, from a liquid suspension of solid material or materials, in a finely divided state, has been known for a long time and certain specific processes utilizing that basic concept are described in a variety of United States and other patents. Examples of these patents are those to Puddington and Farnand U.S. Pat. No. 3,268,071, Sirianni and Puddington U.S. Pat. No. 3,368,004, Capes et al U.S. Pat. No. 3,471,267 and Caswell et al U.S. Pat. No. 4,003,737. Briefly, all of these patents relate to a procedure wherein powders are suspended in a first liquid which is lyophobic to said powders, a second or bridging liquid is then added thereto which is chosen or treated so as to be lyophilic to at least certain of said powders, and the system is then agitated. This forms the material which is lyophilic to the bridging liquid into a plurality of agglomerates whose size and shape depend on the details of said procedure as same are set forth at length in said patents and to which reference is invited. These procedures may be and are used both for the separation of one of a mixture of solids from such mixture and such is the main purpose of the above-mentioned Puddington U.S. Pat. No. 3,268,071, or they may be and are used where the formation of an agglomerated product is the objective itself of the agglomeration procedure and such is the principal purpose of the other patents above-named.

Referring to the materials employed in the process according to the invention, so-called "wet-process" phosphoric acid is a well-known material of commerce which is produced by reaction of phosphate rock with sulfuric acid. As is well known, in the preparation of animal feed grade dicalcium phosphate, the starting wet-process phosphoric acid must be substantially free of fluorine because fluorine is a toxic substance when present in the animal diet to more than a very limited amount. A variety of methods are known for defluorinating wet-process phosphoric acid and it is unnecessary to described same herein because they form no part of the present invention. Thus, according to the invention, one of the starting materials is defluorinated, wet-process phosphoric acid liquid. The $H_3PO_4$ concentration of this feed liquid is not critical. It is convenient to use the conventional commercially available defluorinated wet-process phosphoric acid having an $H_3PO_4$ concentration of about 85 wt. %, and the balance is essentially water. It is preferred that the $H_3PO_4$ concentration of this feed liquid is at least about 40 wt. % in order to minimize the amount of water that must be removed in the drying step.

The second feed liquid is a slurry or suspension of calcium oxide particles, slurried or suspended in a water-soluble, inert, organic, carrier liquid. The concentration of the calcium oxide-supplying particles in the slurry or suspension is not critical. However, sufficient of the organic carrier liquid is used so that the reaction mixture is a free-flowing liquid of suitably low apparent viscosity, whereby it can be effectively vigorously agitated during the reaction, for example, an apparent viscosity of up to about 500 cp. In order to minimize the size of the mixing equipment and the amount of organic carrier liquid that is used, it will be desirable to limit the amount of organic carrier liquid that is used to the amount necessary to achieve thorough mixing of the feed liquids. Thus, for example, it is effective to use a weight ratio of (CaO particles)/(organic liquid) of less than 1/1, preferably from about 1/5 to about 1/100. The particle size of the calcium oxide-supplying material is sufficiently small that the CaO can react rapidly and completely with the phosphoric acid. For example, when using CaO particles, the particle size is desirably less than about 100 mesh, preferably less than about 200 mesh (United States standard sieve).

The water-insoluble, inert, organic, carrier liquid can be selected from a wide range of organic liquids which are substantially inert to calcium oxide, phosphoric acid and water, which are liquid at the reaction temperature employed and which have a sufficiently low viscosity at the reaction temperature so as to provide a free-flowing reaction system capable of being vigorously agitated. The organic liquid should be present in major proportion (by volume) of the reaction system, i.e., it should form the continuous phase of the reaction system. The organic liquid can be a single compound or a mixture of mutually soluble compounds. Suitable organic liquids include aliphatic and aromatic hydrocarbons, aliphatic halogenated hydrocarbons and the like. For example, trichloroethane is an effective organic carrier liquid for the purposes of the invention.

The reaction should be carried out at a temperature below the boiling points of water and the organic carrier liquid. Preferably, the reaction temperature does not exceed about 70° C. and, especially preferably, the reaction is carried out at a temperature between about 15° C. and 45° C. If cooling of the reaction system is necessary in order to maintain the desired reaction temperature, in view of the fact that the reaction is exothermic, cooling can be achieved by externally cooling the reaction system and/or by cooling one or both of the feed liquids.

The reaction can be carried out as either a continuous process or a batch process. In either case, it is simple and convenient to feed (1) the calcium oxide/organic liquid slurry and (2) the defluorinated wet-process phosphoric acid solution, in substantially stoichiometric proportions, relating to the aforementioned reaction scheme. Vigorous stirring is necessary in order to rapidly and completely mix the reactants with each other. High speed stirrers are especially preferred. For example, the feed solutions can be fed to a reactor provided with cooling means. In batch operations, it is preferred to add the defluorinated wet-process phosphoric acid to the vortex formed by vigorous agitation of the calcium oxide/organic liquid slurry previously placed in the reaction vessel.

The presence of free water in the reaction mixture, during the reaction, is critical, for reasons to be pointed out hereinbelow. In this context the term "free water" means water which is present in the reaction mixture, other than the water which is formed by the reaction. During the reaction, the free water is present as liquid water effective as a bridging liquid between the calcium oxide particles and the dicalcium phosphate particles which are formed by the reaction of the calcium oxide particles with the phosphoric acid. Some or all of this initially free water may be transformed to water of hydration in the dicalcium phosphate particles during later stages of the reaction or afterwards. The amount of free water present at the start of the reaction is at least about 1% by volume, based on the volume of the dicalcium phosphate product. This free water is present as a bridging liquid on the surfaces of the dicalcium phosphate particles formed by the reaction.

To insure that an adequate amount of free water is present in the reaction mixture, the total amount of water added to the reaction mixture is at least about 10 wt. %, preferably from about 50 to 200 wt. %, based on the weight of the CaO particles. The total water added to the reaction mixture, i.e., excluding the water formed by the reaction, is supplied by the water present in the phosphoric acid solution and/or by water which is added separately to the reaction system. Normally, the agglomeration and the reaction are conducted simultaneously. If desired, however, water can be added after the reaction of CaO and $H_3PO_4$ is completed whereby to complete the reaction before effecting substantial agglomeration.

During the reaction, the CaO particles react with phosphoric acid to form dicalcium phosphate. The reaction is carried out in the presence of the inert, water-insoluble, organic, liquid, carrier medium. The reaction mixture is a suspension of the solid particles in the organic liquid and the reaction mixture is vigorously agitated. The finely divided CaO particles are preferentially wetted by the wet-process phosphoric acid solution and the water that are added to the reaction mixture whereby the CaO particles are rapidly transformed to dicalcium phosphate particles and, concurrently, the solids in the reaction system are formed into agglomerates. The agglomeration occurs in a very short period of time and more or less simultaneously with the reaction. The vigorous stirring of the liquid reaction system causes repeated collisions of the water-wetted solid particles, thereby forming in the system a dispersion of agglomerates of solid particles in the organic liquid. Because agglomeration occurs over a period of time, the nature of the agglomerates at any given instant cannot be precisely defined, but it seems likely that the reaction mixture includes both CaO particles undergoing reaction and agglomeration, as well as dicalcium phosphate particles undergoing agglomeration. The agglomerates that are finally formed consist essentially of dicalcium phosphate particles connected by liquid bridges of water. The size of the final agglomerates can be controlled by adjusting the duration of agitation and by adjusting the amount of water. The agglomerate size can be, for example, about 40 United States standard sieve size suitable for incorporation in animal feeds.

After the reaction has been completed and the final dicalcium phosphate agglomerates have been formed, the agglomerates are recovered from the organic liquid carrier. For example, the agglomerates can be recovered by screening, filtering or centrifuging. Then the agglomerates are dried, such as by gentle heating in an oven, so as to remove residual organic liquid therefrom, whereby to obtain substantially dry agglomerates of dicalcium phosphate.

The following example serves to illustrate the invention, but the invention is not limited thereto.

EXAMPLE

Into a beaker having a volumetric capacity of 1,000 ml, there was added 500 ml of trichloroethane. Then, 56 g of CaO particles having a particle size of less than 200 mesh were added to the trichloroethane and the mixture was vigorously stirred by means of a propeller-type agitator so as to form a suspension. To the vortex generated in the suspension by the rotation of the agitator, there was slowly added 115 g of wet-process phosphoric acid (85% $H_3PO_4$) to effect the reaction to form dicalcium phosphate and, also, 19 g of water were added. The reaction system was further agitated for a period of about 2 minutes while maintaining the temperature of the reaction mixture at 35° to 45° C. Agitation was discontinued and then the reaction mixture was screened with a 200 mesh screen to separate the freely drainable trichloroethane therefrom. The thus-separated solids were dried under a heat lamp for two hours to completely dry same. The thus-obtained agglomerates had an average particle size of 40 United States standard sieve. Chemical analysis of the agglomerates revealed that they contained 18.51% P and 20.89% Ca, which values are higher than the minimum specifications for dicalcium phosphate for use as a commercial feed additive.

The embodiments of the invention in which an exclusive property or privilege is claimed are defined as follows:

1. A process for preparing granular dicalcium phosphate suitable for use as an animal feed supplement, which comprises the steps of: agitating a slurry of finely divided calcium oxide-supplying reactant particles suspended in a water-soluble, inert, organic liquid; introducing into said slurry while it is being agitated and thoroughly mixing therein water and defluorinated wet-process phosphoric acid in the stoichiometric amount necessary for the formation of dicalcium phosphate, the thus-formed reaction mixture being agitated until the reaction between said calcium oxide-supplying reactant and said phosphoric acid is substantially complete whereby to form dicalcium phosphate which is substantially free of unreacted phosphoric acid and unreacted calcium oxide reactant, the agitation of the reaction mixture effecting repeated collisions of solid particles whereby to form agglomerates suspended in said organic liquid and wherein after completion of the reaction the agglomerates consist essentially of the dicalcium phosphate particles bound together by said water; then discontinuing said agitating; separating said agglomerates from said inert organic liquid; and recovering said agglomerates substantially free of said inert organic liquid.

2. The process of claim 1 in which said calcium oxide-supplying reactant particles are lime particles having a particle size of less than about 100 mesh.

3. The process of claim 2 in which the weight ratio of lime particles to said organic liquid is from 1:1 to 1:100.

4. The process of claim 3 wherein said defluorinated wet-process phosphoric acid is an aqueous solution containing from 40 to 85 wt. % of $H_3PO_4$.

5. The process of claim 4 wherein the reaction temperature is from 15° to 70° C.

6. The process according to claim 1, claim 2, claim 3, claim 4 or claim 5 in which the reaction mixture contains from 10 to 200 wt. % of water, based on the weight of said calcium oxide-supplying material.

7. The process according to claim 1 in which said inert organic liquid is removed from said agglomerates by heating to evaporate said inert organic liquid.

* * * * *

UNITED STATES PATENT AND TRADEMARK OFFICE
CERTIFICATE OF CORRECTION

PATENT NO. : 4 265 867
DATED : May 5, 1981
INVENTOR(S) : Bruce F. Caswell

It is certified that error appears in the above—identified patent and that said Letters Patent is hereby corrected as shown below:

Column 5, line 30; change "water-soluble" to
---water-insoluble---.

Signed and Sealed this

Eighteenth Day of August 1981

[SEAL]

Attest:

GERALD J. MOSSINGHOFF

Attesting Officer    Commissioner of Patents and Trademarks